United States Patent
Sharma (10) Patent No.: US 10,104,516 B2
(45) Date of Patent: Oct. 16, 2018

(54) DYNAMIC DISTRIBUTION IN AN OFFLINE CHARGING SYSTEM

(71) Applicant: Alcatel-Lucent USA Inc., Murray Hill, NJ (US)

(72) Inventor: Ranjan Sharma, New Albany, OH (US)

(73) Assignee: Nokia of America Corporation, Murray Hill, NJ (US)

( * ) Notice: Subject to any disclaimer, the term of this patent is extended or adjusted under 35 U.S.C. 154(b) by 0 days.

(21) Appl. No.: 15/085,055

(22) Filed: Mar. 30, 2016

(65) Prior Publication Data

US 2017/0289784 A1    Oct. 5, 2017

(51) Int. Cl.
| | |
|---|---|
| *H04W 4/24* | (2018.01) |
| *H04L 29/08* | (2006.01) |
| *H04L 12/26* | (2006.01) |
| *H04L 12/14* | (2006.01) |
| *G06Q 30/04* | (2012.01) |
| *H04W 4/26* | (2009.01) |

(52) U.S. Cl.
CPC .............. *H04W 4/24* (2013.01); *G06Q 30/04* (2013.01); *H04L 43/10* (2013.01); *H04L 43/103* (2013.01); *H04L 67/1002* (2013.01); *H04W 4/26* (2013.01); *H04L 12/14* (2013.01); *H04L 43/0817* (2013.01); *H04L 43/0864* (2013.01); *H04L 43/0876* (2013.01)

(58) Field of Classification Search
CPC ................................ H04W 4/26; G06Q 30/04
See application file for complete search history.

(56) References Cited

U.S. PATENT DOCUMENTS

| | | | |
|---|---|---|---|
| 8,116,728 | B2 | 2/2012 | Cai et al. |
| 2009/0063315 | A1* | 3/2009 | Cai .................... G06Q 30/0284 |
| | | | 705/32 |
| 2009/0083861 | A1 | 3/2009 | Jones |
| 2009/0232011 | A1* | 9/2009 | Li .......................... H04L 43/50 |
| | | | 370/248 |
| 2013/0091041 | A1 | 4/2013 | Sharma |

(Continued)

FOREIGN PATENT DOCUMENTS

WO    2009086932 A1    7/2009

OTHER PUBLICATIONS

International Search Report—International Application No. PCT/US2017/022006 filing date Mar. 13, 2017, dated May 26, 2017—4 pages.

*Primary Examiner* — Joseph Dean, Jr.
(74) *Attorney, Agent, or Firm* — Nokia Technologies Oy (57) ABSTRACT

Systems and methods are provided for processing messages in an Offline Charging System (OFCS) of a communications services provider. A front-end distributor unit receives Diameter messages from a Charging Trigger Function (CTF) and distributes the Diameter messages to Charging Data Function (CDF) units of the OFCS. The distributor unit receives Diameter response messages from CDFs and calculates performance metrics based on the distributed messages and their responses. The distributor unit computes revised distribution weights used for distributing new Diameter messages for new Diameter sessions to the CDF units based on the measured metrics, thus adjusting the distribution pattern of the Diameter messages based on estimated workload conditions at the CDFs.

20 Claims, 5 Drawing Sheets

(56) References Cited

U.S. PATENT DOCUMENTS

| | | |
|---|---|---|
| 2013/0322430 A1 | 12/2013 | Mann |
| 2014/0068748 A1* | 3/2014 | Mann ................. H04L 63/0263 726/11 |
| 2014/0304415 A1 | 10/2014 | Prakash et al. |
| 2015/0312743 A1* | 10/2015 | Sharma ................. H04M 15/65 455/406 |

* cited by examiner

| CDF-ID | Overall Response Running Avg (ms) | RTT over N1 ACRs (seconds) | RTT over N2 Unit Time (seconds) | Assigned Weights | Count Of Current Sessions | Count Of ACRs Sent | Revised Distribution Weights |
|---|---|---|---|---|---|---|---|
| CDF1 | ra-ms1 | rtt1-n1 | rtt1-n2 | w1 | Num-sess1 | Cdf1-acrs | w1' |
| CDF2 | ra-ms2 | rtt2-n1 | rtt2-n2 | w2 | Num-sess2 | Cdf2-acrs | w2' |
| CDF3 | ra-ms3 | rtt3-n1 | rtt3-n3 | w3 | Num-sess3 | Cdf3-acrs | w3' |

| CDF-ID | Overall Response Running Avg (ms) | RTT over N1 ACRs (seconds) | RTT over N2 Unit Time (seconds) | Assigned Weights | Count Of Current Sessions | Count Of ACRs Sent | Revised Distribution Weights |
|---|---|---|---|---|---|---|---|
| CDF1 | 10 | 10 | 10 | 1 | Num-sess1 | cdf1acr | .367 |
| CDF2 | 11 | 11 | 11 | 1 | Num-sess2 | cdf2acr | .333 |
| CDF3 | 12 | 12 | 12 | 1 | Num-sess3 | cdf3acr | .306 |

DYNAMIC DISTRIBUTION IN AN OFFLINE CHARGING SYSTEM

TECHNICAL FIELD

The present disclosure is directed towards communication systems, and in particular, to systems and methods for processing messages in a telecommunication network.

BACKGROUND

Telecommunication service providers typically provide numerous voice and data services to end users (also referred to as subscribers) over a telecommunication network. Examples of voice services are voice calls, call forwarding, call waiting, etc. Examples of data services are messaging, streaming audio, streaming video, Voice over Internet Protocol (VoIP), online gaming, and IP-TV. The data services are managed by a packet core network, which interfaces the end user with external Packet Data Networks (PDN), such as the Internet. Some examples of packet core networks are a General Packet Radio Service (GPRS) core network, an Evolved Packet Core (EPC) of a Long Term Evolution (LTE) network, etc. Mobile devices, such as cell phones, personal data assistants, smart phones, notebook computers, etc., may access the data services provided by the networks over an air interface with one or more base stations.

The service providers use offline and online charging functions to keep track of the resource usage incurred by each device for using the various services provided over the telecommunications network. The 3GPP/3GPP2 standards groups have defined a set of specifications that may be used to implement online charging systems and offline charging systems in the various network domains (e.g., a circuit-switched domain, a packet-switched domain, and/or a wireless domain), IP multimedia subsystems, and emerging 3G/OMA application services.

According to 3GPP TS 32.240, offline charging is a process where charging information for network resource usage is collected concurrently with the resource usage. The charging information is passed through a chain of charging functions, which results in the generation of Charging Data Record (CDR) files that are transferred to the network operator's Billing Domain for subscriber billing and/or inter-operator accounting. To implement offline charging, a Charging Trigger Function (CTF) is implemented in a network element that provides a service. The CTF collects information pertaining to chargeable events, assembles this information into matching charging events, and sends the charging events to a Charging Data Function (CDF), which may be implemented in the network element or in the Offline Charging System (OFCS).

The CDF receives the charging events from one or more CTFs, and uses the information included in the charging events to construct CDRs. A CDR is a formatted collection of information about a chargeable event (e.g., time of call set-up, duration of the call that can be derived based on embedded timestamps in the record, amount of data transferred, etc.) for use in billing and accounting. The CDF then sends the CDRs to a Charging Gateway Function (CGF) of the OFCS. The CGF acts as a gateway between the network and the billing domain. Therefore, the CGF collects CDRs from the CDF (and other CDFs), optionally correlates the CDRs and writes the CDRs into a CDR file, and makes the CDR file available to the billing domain.

A typical operator network will utilize multiple CDFs and CGFs to implement offline charging. Thus, a front-end device, such as a Diameter Routing Agent (DRA), is used in conjunction with (or as part of) the OFCS to distribute charging events from the CTFs to the CDFs. The front-end distributor device typically uses a distribution algorithm to select a CDF for a particular session. For example, a distribution algorithm utilized by the distributor unit may process a session identifier from a Diameter ACR with a hashing function or another function to select a CDF. The front-end distributor device then routes the Diameter ACR to the selected CDF.

BRIEF SUMMARY

In various aspects, systems and methods for distributing and processing accounting messages via a distributor unit to an Offline Charging System (OFCS) of a telecommunications services provider are provided.

In various aspects a distributor unit for an Offline Charging System (OFCS) of a telecommunications network is provided. The distributor unit is configured for distributing Diameter messages associated with a plurality of Diameter sessions to a plurality of Charging Data Function (CDF) units of the OFCS in accordance with distribution weights associated with each of the plurality of CDF units, such that Diameter messages associated with a same Diameter session are distributed to a same CDF unit. The distributor unit is further configured for receiving Diameter response messages from the plurality of CDF units in response to the distributed Diameter messages, and calculating measured metrics for each the plurality of CDF units based on the distributed Diameter messages and the received Diameter response messages. The distributor unit is further configured for adjusting the distribution weights used for distributing Diameter messages for new Diameter sessions to the plurality of CDF units based on the measured metrics.

In one aspect, the distributor unit is further configured for distributing tracer messages as part of the distributed Diameter messages in accordance with distribution weights associated with each of the plurality of CDF units; and, calculating the measured metrics for one or more of the plurality of CDF units based at least in part on the distributed tracer messages and corresponding Diameter response messages received in response to the distributed tracer messages.

In one aspect, the distributor unit is further configured for distributing tracer messages that are malformed Diameter messages and the receiving corresponding Diameter response messages that are error messages rejecting the distributed tracer messages.

In one aspect, the distributor unit is further configured for distributing the tracer messages to the plurality of CDF units only during a quiescent period of time that is determined based on the measured metrics.

In one aspect, the distributor unit is further configured for calculating a lifetime average response time for each of the plurality of CDFs units taking into account a plurality Diameter messages distributed to and corresponding response messages received from each respective CDF unit.

In one aspect, the distributor unit is further configured for calculating a running Round Trip Time for each of the plurality of CDFs units taking into account most recent N number of Diameter messages distributed to and corresponding response messages received from each respective CDF unit.

In one aspect, the distributor unit is further configured for calculating a running Round Trip Time for each of the plurality of CDFs units taking into account Diameter messages distributed to and corresponding response messages received from each respective CDF unit over a given M duration of time.

In one aspect, the distributor unit is further configured for calculating a total number of current sessions hosted by each of the plurality of CDFs units based on account Diameter messages distributed to and corresponding response messages received from each respective CDF.

In one aspect, the distributor unit is further configured for calculating a total Diameter messages distributed to each respective CDF.

In one aspect, the distributor unit is further configured for distributing Diameter messages associated with a same Diameter session to a same one of the plurality of CDFs.

DETAILED DESCRIPTION

Various aspects of the disclosure are described below with reference to the accompanying drawings, in which like numbers refer to like elements throughout the description of the figures. The description and drawings merely illustrate the principles of the disclosure. It will be appreciated that those skilled in the art will be able to devise various arrangements that, although not explicitly described or shown herein, embody the principles and are included within spirit and scope of the disclosure.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

Offline Charging System (OFCS) provides the basis for post-paid billing for services rendered by telecommunication service providers, where subscribers are charged at the end of their billing cycle according to their usage of one or more services. Various network elements (NEs) implementing an integrated Charging Trigger Function (CTF) connect with and provide charging information to the OFCS for services rendered to one or more telecommunication subscribers' User Equipment (UE). The OFCS receives the information regarding the chargeable events from one or more CTFs and generates CDRs based on the chargeable information. A CDR is a formatted collection of information about a chargeable event (e.g., time of call set-up, duration of the call that can be derived based on embedded time stamps in the record, amount of data transferred, etc.) for use in billing and accounting. CDRs pertaining to a particular session may be aggregated and correlated into a consolidated CDR file, which is made available to the billing domain for charging subscribers for various services and/or sessions provided by the telecommunications network.

Communications between the NE/CTFs and the OFCS occur via messages in accordance with the Diameter Protocol which is defined by the Internet Engineering Task Force (IETF) in RFC 6733 (which supersedes RFC 3588). Charging related messages (whether event-based or session-based) are provided by NEs to the OFCS in Accounting Request Messages (ACRs) using the Diameter Protocol (referenced herein as ACR or Diameter messages). ACRs are used for both session-related and event-related charging/accounting. ACRs, and their Diameter response messages, ACAs, consist of a Diameter Protocol header and a number of attribute-value pairs (AVPs) which form the data portion of the messages. Offline charging can be of two types: session-based or event-based. In event-based charging, the CTF reports a usage or service rendered as a single operation or event, such as subscriber registration, re-registration, de-registration, etc. The CTF reports the single, session-less event in Diameter protocol message known as an ACR Event message. Session-based charging is the process of reporting usage reports for a session (e.g., a voice or data session). The CTF reports session charging information in Diameter messages known as ACR Start, ACR Stop, and ACR Interim messages that respectively denote the start, end, and interim session accounting data for charging for the type and duration of the session. During a session for which charging information is initiated with an ACR Start message at the Start of the session and terminated with an ACR Stop message at the end of the session, the CTF may transmit multiple ACR Interim messages depending on the proceeding of the session.

The OFCS is engineered to handle a certain volume of messages or traffic. Typical inputs that are considered while engineering the capacity of a OFCS include subscriber count, number of NE/CTFs expected to be serviced, network characteristics, average durations of the voice or data sessions, amount of processing and storage, and the like, which are used to implement or allocate one or more of the physical resources (e.g., CPU, memory, I/O, etc.) for the various OFCS functions, including the Charging Data Function (CDF) and the Charging Gateway Function (CGF), which are collectively referenced as the Charging Collection Function (CCF) of the OFCS.

A CCF can exhibit several bottlenecks, as the systems that implement the functions of the OFCS are provided with a finite amount of physical resources such as processing capacity (number of CPUs, cores per CPU, threads per core), primary memory, secondary memory, queues, etc. For instance, calls or sessions that are associated with a long duration often run against the memory bottleneck, whereas shorter duration calls (more typical) tend to run against the CPU utilization limits. In some cases, the link bandwidth between the NE/CTF and the CCF can become a bottleneck, and in yet other situations, the storage space on the CCF can be the bottleneck.

Thus, as described in detail below, systems and methods are provided for processing messages in an Offline Charging System (OFCS) of a communications services provider. A front-end distributor unit receives Diameter messages from a Charging Trigger Function (CTF) and distributes the Diameter messages to Charging Data Function (CDF) units of the OFCS. The distributor unit receives Diameter response messages from CDFs and calculates performance metrics based on the distributed messages and their responses. The distributor unit computes revised distribution weights used for distributing new Diameter messages for new Diameter sessions to the CDF units based on the measured metrics, thus adjusting the distribution pattern of the Diameter messages based on estimated workload conditions at the CDFs.

Figure 1:
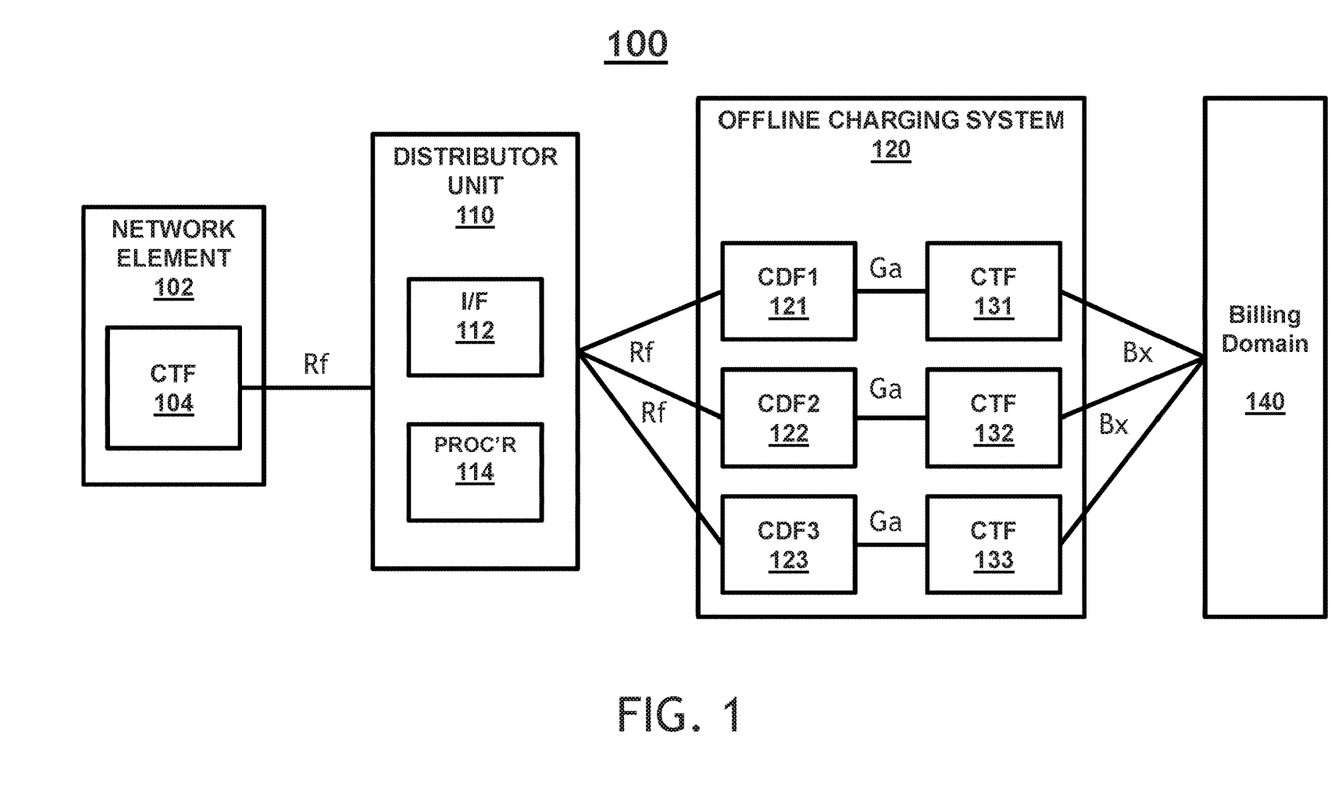
FIG. 1 illustrates an example embodiment of a distributor unit in an offline charging architecture.

FIG. 1 illustrates an offline charging architecture 100 in an exemplary embodiment. Architecture 100 may be implemented as part of a circuit-switched telecommunications network or a packet-switched telecommunications network for enabling offline charging functions for services provides to the telecommunication networks subscribers (i.e., end user and associated User Equipment (UE)). Some exemplary types of networks suitable for use with architecture 100 include IP Multimedia Subsystem (IMS) networks, Long Term Evolution (LTE) networks, General Packet Radio Service (GPRS), etc.

Architecture 100 includes a Network Element (NE) 102 that connects to an offline charging system (OFCS) 120 through a front-end distributor unit 110. A network element 102 is an apparatus or equipment used in the provision of services provided by a network. For example, a network element may comprise a Serving-Call Session Control Function (S-CSCF) or application server (AS) of an IMS network, a Serving Gateway (SGW) or a Packet Data Network Gateway (PGW) of an LTE network, etc. Network element 102 includes a Charging Trigger Function (CTF) 104 that detects chargeable events for services provided by network element 102, assembles information for the chargeable events into matching charging events, and sends the charging events to a Charging Data Function (CDF). In the case of network element 102, CTF 104 uses a Diameter Rf interface. Therefore, CTF 104 assembles the charging information into accounting requests, such as a Diameter Rf Accounting Requests (ACRs). Although one NE 102 and one CTF 104 are illustrated in FIG. 1, there may be many NE/CTFs in contact with distributor unit 110. Although not specifically illustrated in FIG. 1, network element 102 may include a controller (e.g., a suitably programmed processor), memory, or other typical computing components for implementing the functionality of the NE and the CTF.

OFCS 120 is an apparatus, a server, a device, or equipment configured to implement offline charging for sessions or services provided via the telecommunications network. OFCS 120 includes a plurality of CDFs (CDF1-CDFn) 121-123. A CDF comprises a unit within OFCS 120 that receives charging information (via ACR messages) from the CTFs integrated or associated with particular network elements, formats the charging events into CDRs, and sends the CDRs to a CGF. OFCS 120 also includes a plurality of CGFs (CGF1-CGFn) 131-133. A CGF comprises an element or module within OFCS 120 that correlates CDRs for a session, and forwards a CDR file with the correlated CDRs to a billing domain 140. Billing domain 140 is the part of the operator network that receives and processes CDR files for billing mediation and other billing applications (e.g., statistical applications). CDFs in OFCS 120 communicate with CGFs over a Diameter Ga interface. In the case shown in FIG. 1, GTP' is used on the Ga interface to transport CDRs from the CDFs to the CGFs. While a 1:1 relationship is shown between CDFs and CGFs in FIG. 1, an N:1 relationship is also possible. Although not specifically illustrated in FIG. 1, OFCS 120 may include one or more processors or other hardware components that implement CDFs 121-123 and CGFs 131-133.

The front-end Distributor unit 110 is implemented between CTFs (e.g., CTF 104) and the CDFs 121-123 in OFCS 120. The purpose of distributor unit 110 is to distribute Diameter or ACR request messages (i.e., ACRs) from CTFs to the multiple CDFs 121-123 within OFCS 120. In this embodiment, distributor unit 110 includes an interface (I/F) 112 and a processor (PROC'R) 114. Interface 112 comprises a component (e.g., hardware, software, or a combination of hardware and software) for communicating via Diameter Rf protocol or another type of protocol. Processor 114 comprises a component (i.e., hardware) that performs logic to distribute Diameter requests received from CTF(s) 104 to respective CDFs 121-123 of the OFCS 120. Although distributor unit 110 is illustrated as being outside of OFCS 120, in some embodiments the distributor unit 110 may be implemented on the same platform as OFCS 120.

Where OFCS 120 is implemented using a blade system architecture, for example, any or all of the distributor unit 110, CDFs 121-123, and CGFs 131-133 may be implemented to execute on respective blades (or servers) of a server chassis, where each blade includes physical computing resources such as a processor, memory, input/output devices, or other components typically found in computing devices.

The task of distributing Diameter or ACR messages may include considering the weights, current load index, and other parameters of CDFs 121-123 to select a destination CDF instance for handling ACRs for a particular session. Distributor unit 110 may follow a round-robin strategy in selecting a destination CDF for a any particular session. Distributor unit 110 may work as a Back to Back User Agent (B2BUA), where Diameter sessions associated with a particular CTF are terminated on distributor unit 110, and equivalent and corresponding Diameter sessions are started between distributor unit 110 and the selected destination CDF. Each CTF (such as CTF 104), may establish a Diameter connection with the distributor unit 110, and transmit a session-based Diameter ACR message to distributor unit 110 that includes a Diameter "SessionId". The Diameter "SessionId" is unique identifier for each session reported by the CTF.

The distributor unit 110 is configured to use a distribution algorithm to distribute ACRs associated with particular service sessions to particular CDFs 121-123. A distribution algorithm comprises any set of rules for determining a destination CDF for ACRs for particular sessions. In one embodiment, distributor unit 110 may use a "consistent hashing" algorithm to select a destination CDF for a particular Diameter session. The consistent hashing algorithm (or other type of algorithm) may use "SessionId" information included in the ACRs (e.g., Diameter requests) and unique CDF identifiers to select a destination CDF for a given Diameter session, such that each CDF is allocated with processing fair share of sessions.

For session-based charging messages, the front-end load distributor is configured to direct all ACR messages from a specific NE/CTF that pertain to the same Diameter session to the same destination CDF. Such "Session-Stickiness" is implemented to avoid generation of "incomplete CDRs" that result when ACR messages for a session are distributed and processed in different CDFs. Reconciling, that is, identify, correlating, and processing information provided in ACR Start, ACR Interim, and ACR Stop messages for the many thousands of sessions hosted by the network based on the incomplete CDRs that are generated when ACRs for a given session are distributed to different CDFs is a non-trivial and processing intensive task, especially when usage containers are reported in case of LTE CDRs generated for SGW (Serving Gateway) and PGW (PDN Gateway). Operators endeavor to put corrective measures in the network to avoid this scenario, since the incomplete CDRs are often deemed non-billable and represent revenue leakage.

Selecting a destination CDF for a Diameter session based on a static distribution algorithm may be acceptable when the CDFs of an OFCS are operating normally. However, static distribution is more problematic when one or more of the CDFs encounter higher loads that affect performance, since static distribution does not take actual workload into account. However, temporary spikes in workload or physical resource constraints (e.g., CPU, memory, etc.) can impact performance characteristics, causing a CDF to fall into an overloaded state (e.g., a state where the CDF resources are outside optimum or designed parameters). A severe enough overload condition can result in the CDF being out-of-service, or being unable to process pending or new ACR messages within desired parameters, ultimately resulting in incomplete CDRs being reported to the billing system.

Since overload conditions can often be temporary, there are a number of ways to alleviate processing in an overloaded CDF so that it can work-through its current workload and return to normal operating conditions. See, for example, commonly assigned U.S. Pat. No. 9,161,199 ("'199 patent"), the contents of which are incorporated by reference herein in its entirety. Solutions for alleviating overload conditions that are being experienced at the CDF are often effective. It is desirable, however, to provide additional approaches that may prevent, or provide an early detection, of situations that can cause an overload condition in the first place. It is also desirable to provide solutions that do not require operational changes in the CTF and the CDFs. In the following embodiments, various aspects of a distribution process are described which take into account estimated workload conditions of the CDFs and adjust the distribution of ACR messages received from a CTF to reduce the occurrence or limit the severity of an overload condition at a CDF.

As an overview of one exemplary embodiment, a distributor unit (e.g., distributor unit 110) in accordance with aspects of the disclosure is configured to receive Diameter messages for one or more Diameter sessions from one or more CTFs (e.g., CTF 104). The distributor unit is configured to distribute the Diameter messages to a plurality of CDFs in accordance with a distribution algorithm, such as the "consistent hashing" algorithm described above. The distributor unit is further configured to receive Diameter response messages from the CDFs in response to the distributed Diameter messages. The distributor unit is configured to calculate and monitor metrics for the performance of the CDF units based on the distributed Diameter messages and the corresponding Diameter response messages received from the CDFs. The distributor unit is configured to use the calculated metrics to determine or estimate that the workload of one or more of the CDFs is diverging from desired workload parameters, and to adjust the distribution algorithm to dynamically change the distribution pattern of Diameter messages for new sessions to the CDFs. In doing so, the distributor unit is configured to maintain "session-stickiness" while taking the workload conditions of the CDFs into account when distributing the Diameter messages. These and other aspects are now described in further detail below.

Figure 2:
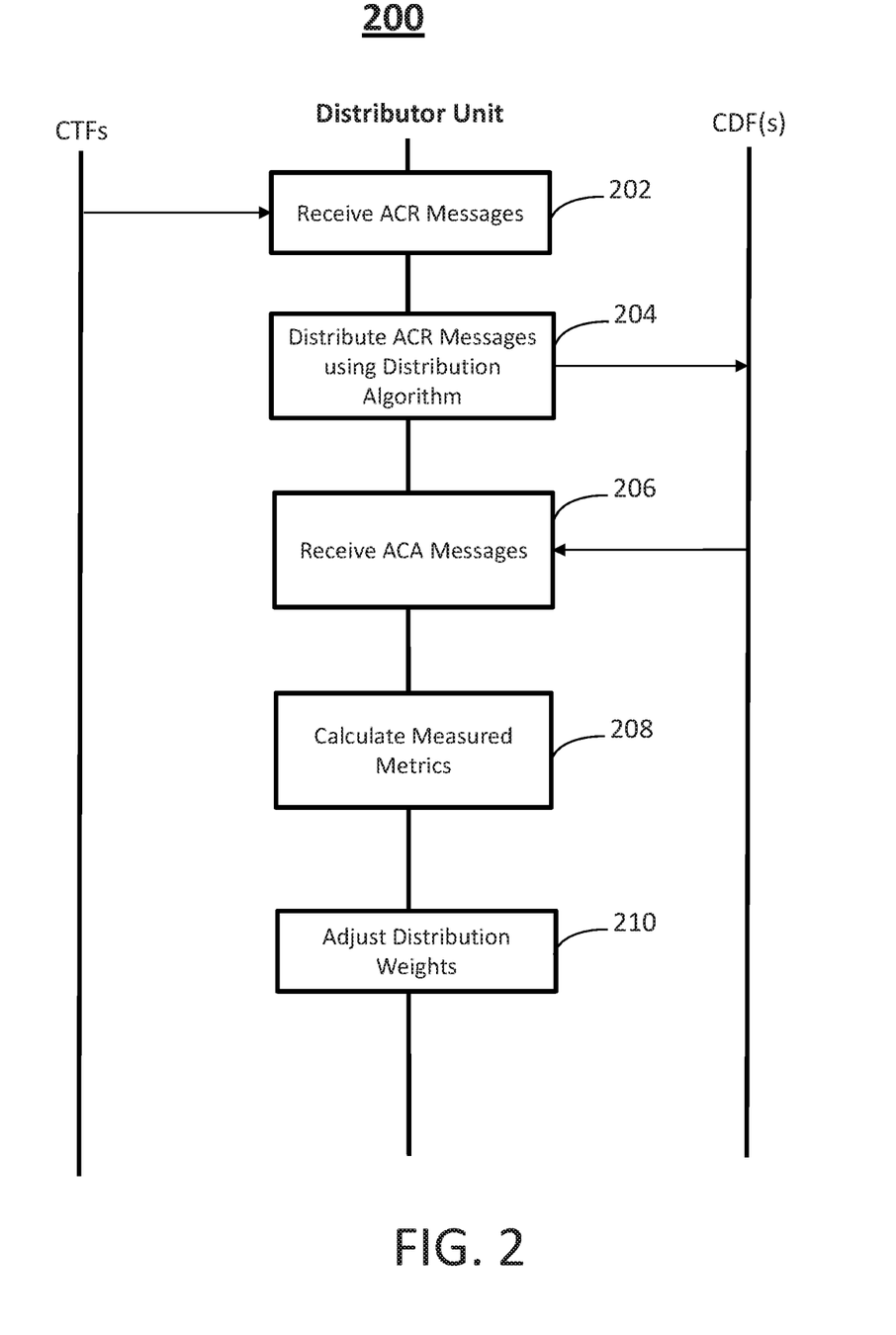
FIG. 2 illustrates an example of a Diameter request distribution process in accordance with various aspects of the disclosure.

FIG. 2 is a flow chart illustrating an iterative process or method 200 for distributing Diameter (ACR) request messages to destination CDFs in accordance with various aspects of the disclosure. The steps of process 200 will be described with reference to distributor unit 110 in FIG. 1, but those skilled in the art will appreciate that process 200 may be performed in other systems. Furthermore, while particular steps are described in a particular order for enabling the reader to more easily understand the various aspects and principles of the disclosure, it will be readily apparent from the description below that in other embodiments the steps may be modified, combined, reordered, and added as will be understood by those skilled in the art.

To begin, it is assumed that CTF 104 detects chargeable events for session-based services provided by network element 102 (see FIG. 1) to various subscribers of the telecommunication network. The CTF 104 assembles information for the chargeable events into Diameter Rf ACRs (e.g., Diameter or ACR messages) for the plurality of Diameter sessions. Since the services rendered by the NE 102 are assumed to be session-based, CTF 104 is configured to insert a "Start" value in the Accounting-Record-Type AVP of the ACRs for newly initiated sessions, to insert an "Interim" value in the Accounting-Record-Type AVP of the ACRs for ongoing sessions, and to insert a "Stop" value in the Accounting-Record-Type AVP of the ACRs to report terminated sessions. CTF 104 then sends the ACRs (i.e., Diameter Rf Accounting Requests or Diameter messages) to the front-end distributor unit 110 for distribution to the CDFs 121-123.

In step 202, the distributor unit 110 receives Diameter messages from one or more CTFs for distribution to CDFs 121-126. In step 204, distributes the received Diameter messages associated with the plurality of Diameter sessions as they are received from the CTF 104 to the plurality of CDF units 121-123 of the OFCS in accordance with a distribution algorithm, such that Diameter messages associated with a same Diameter session are distributed to a same CDF unit (for "session-stickiness"). As an example, if it is assumed that the CDFs 121-123 are of different capacities and differ in the number of charging messages they can handle in a unit time, then the statically assigned weights of these CDFs 121-123 may be expressed as w1, w2 and w3 respectively.

The distributor unit 110 then assigns new sessions between CDFs 121-123 in w1:w2:w3 proportion. In other words, the distributor unit distributes ACR Start messages (which signal initiation of new sessions), in accordance with the w1:w2:w3 proportion. It can then be expected that the ongoing session counts for each of the CDF units would be commensurate with the relative weights of the CDFs. For example, if w1:w2:w3 is 1:1:2, it can be expected that there will be twice as many ongoing sessions being distributed to CDF3 than at CDF1 or CDF2, while CDF1 and CDF2 handle similar counts of simultaneous sessions. Throughout, the distributor unit 110 maintains "session-stickiness", meaning that once a particular session is allocated to a CDF based on an ACR Start message, the distributor unit 110 continues to distribute additional ACR messages (i.e., ACR Interim and ACR Stop messages) for the same session to the same CDF unit.

In step 206, the distributor unit 110 receives Diameter response messages (also referenced herein as Diameter ACA messages or Diameter response messages) from each of the plurality of CDF units 121-123 in response to the ACRs that are distributed to the CDF units.

In step 208, the distributor unit 110 calculates measured metrics based on the distributed Diameter (ACR) messages and the received Diameter response messages for each of the CDF units 121-123. In an exemplary embodiment, the distributor unit 110 is configured to calculate, based on timestamps typically required and provided in the ACRs and the ACA, a running average as well as Round-Trip-Time (RTT) based on the number of ACR messages (and responses). For example, the distributor unit 110 may be configured to calculate a running average and RTT based on the most recent 'N1' distributed messages (and their responses) over the most recent 'N2' unit of time (e.g., seconds, minutes, etc.), as described in more detail below.

Figure 3:
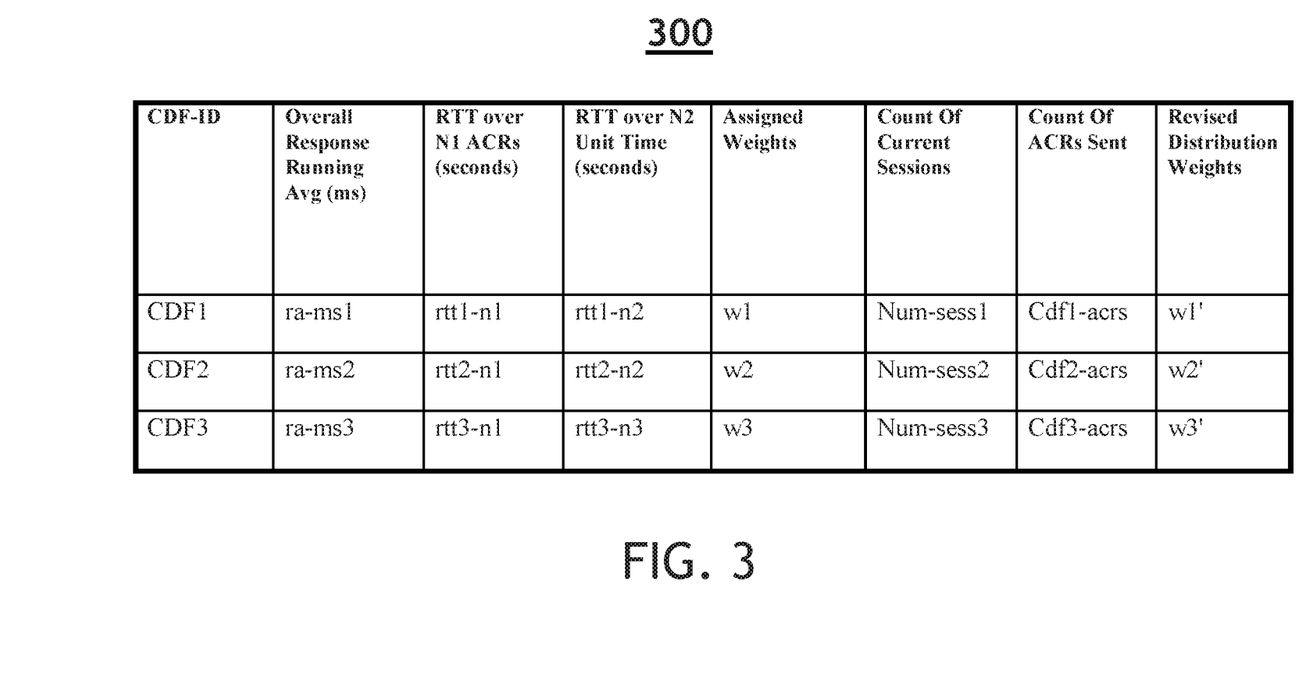
FIG. 3 illustrates is a tabular example of information used for distributing Diameter charging requests or messages.

A particular set of metrics that are calculated and maintained by the distributor unit 110 in accordance with exemplary aspects of the disclosure is illustrated in table form in FIG. 3. The first column ("CDF-ID") of the Table 300 shown in FIG. 3 uniquely identifies the CDFs (i.e., CDFs 121-123 of the OFCS 120) that are fronted by the distributor unit 110.

The second column ("Overall Response Running Average") indicates a calculated lifetime running average (e.g., in milliseconds) value metric that is determined based on all Diameter (ACR) messages that are distributed by the distributor unit 110 to each of the CDFs 121 and the corresponding response messages received from each of the CDFs. Thus, the second column may also be understood as the average response time for each ACR Diameter message transmitted by the distributor unit 110 to a given CDF since initialization.

The third column ("RTT over N1 ACRs") indicates a calculated average RTT value metric (e.g., in seconds) for the last N1 (configurable) number of ACRs distributed by the distributed unit 110 for each of the CDFs 121-123.

The fourth column ("RTT over N2 Unit Time) indicates a calculated RTT value metric (e.g., in seconds) that is determined based on the distributed ACR messages (and received ACA responses) for each of the CDFs 121-123 for the last N2 (configurable) period of time.

The fifth column ("Assigned Weights) indicates the pre-assigned distribution weights that are used to distribute session-based ACR messages to each of the CDFs 121-123. These weight values may generally provide information of a CDFs expected capacity. For CDFs of identical capacity (e.g., configured with similar physical resources), the values may be identical (e.g., w1=w2=w3=1).

The sixth column ("Current Sessions") indicates the calculated count of ongoing sessions metric allocated to each of the CDFs 121-123. For example, the distributor unit 110 may determine the Current Sessions count by incrementing the count for each ACR Start message distributed to a given CDF. The distributor unit 110 may also decrement the count for each ACR Stop distributed to a given CDF. The count may be unchanged for distributed ACR Interim and ACR Event messages, since ACR Event messages are one time messages that are not session-based, and ACR Interim messages, while sessions-based, report charging events related to ongoing sessions but do not initiate or terminate sessions. However, it will be appreciated that the metrics illustrated in Table 300 are exemplary, and in one embodiment a count of the ACR Interim messages transmitted to each of the CDF may also be calculated and maintained as a metric, since the number of ACR Interim messages may be used in one embodiment to estimate memory consumption at the CDFs. In particular, this metric may be useful to monitor for distributed sessions having long durations (e.g., an hour or longer), during which time it may be possible to receive multiple Interim messages which may impact memory at the destination CDF. From a perspective of simultaneous sessions in progress, a count of current sessions as shown in the table 300 may suffice, since it is the CDF's CPU resources (rather than memory) that typically constitute the most common bottleneck in typical OFCS deployments.

The seventh column ("Count of ACRs Sent") indicates the calculated total number of ACRs metric based on ACR Start, Interim, and Stop messages that are distributed to each CDF. This measurement provides an indication on the efficiency of the front-end distribution strategy for comparing expected and measured distribution pattern. On average, if session compositions are similar in terms of the number of ACR messages that are distributed, then the ratio of the values cdf1-acr:cdf2-acr:cdf3-acr can be expected to be generally proportionate to the distribution weight values w1:w2:w3. However, as session composition for the various services provided by the NE is seldom identical, variations in these values for the CDFs can be expected and monitored over time.

The final or eight column ("Revised Weights") indicates the dynamically revised distribution weights that are computed in step 210 by the distributor unit 110 based on the calculated metrics in the other columns of the table, and which are used for distribution of newly reported ACR messages for new Diameter sessions to the CDFs 121-123.

For example, in step 210 the distributor unit 110 is configured to monitor and process the calculated metrics shown in the various columns of table 300 to assess whether one or more of the CDFs 121-123 are experiencing or about to experience a potential work overload, and, if so, to compute revised distribution weights (Revised Weights) that are then used by the distributor unit 110 for distributing Diameter messages for new Diameter sessions to the CDF units 121-123.

Having described various operational steps above, specific exemplary embodiments are described below.

In one exemplary embodiment, the distributor unit 110 is configured to use metrics in column 2 (Overall Response Running Avg) and column 3 (Avg. RTT Over N1 ACRs) of table 300 to assess if one of the CDFs is experiencing a slow-down. In conjunction, the distributor unit 110 may also be configured to use metric information in column 4 (Avg. RTT over N2 Unit Time) for assessing whether one of the CDFs is experiencing a slowdown. For example, it can be expected over time that the calculated metrics in column 3 and/or column 4 may start diverging between the various CDFs. The distributor unit may be configured to monitor the divergence as an indication that the CDFs are not equally responsive. While such divergence may occur because of differences in session characteristics between the sessions handled by each of the CDFs, it is expected that such differences are transient and average out over time, and thus if they do not, it may indicate a problem.

The ideal observation should indicate that the calculated metric values rtt1−n1:rtt1−n2:rtt1−n3 are proportional to 1:1:1, or that the calculated metric values rtt2−n1:rtt2−n2:rtt3−n3 are proportional to 1:1:1, or both. A deviation from the norm in the proportion of these metrics may be understood by the distributor unit 110 as an indication for a need for course correction in distribution of new ACR messages.

In another exemplary embodiment, the distributor unit 110 is configured to use a variation of conventional traffic route shaping based on the calculated and observed metrics shown in Table 300. In accordance with this aspect, the distributor 110 is configured to monitor the calculated metrics associated with the CDFs 121-123 that it fronts, and to make routing decisions based monitored metrics associated with each of the CDFs. Generally, traffic shaping is used to throttle the data transmission speed, so as to adhere to a policy established in the network for various usages. Traffic shaping allows intermediate agents to insert delays in the path of packet traversal, so that the packets may arrive at a destination according to a network policy. Typical usage consists of bandwidth throttling, or reducing available speed after a consumer has used up a granted quota. The result is in slowing down the datagrams, or data packets, so that the established policy guidelines can be met. As an example, an operator may allow subscribers to get a finite amount of data at a higher speed, and then reduce the speed in one or more tiers.

More particularly in accordance with this embodiment, the distributor unit 110 is configured to monitor the performance of the CDFs based on the calculated Avg. RTT metrics and to dynamically adapt the distribution algorithm to distribute new traffic (ACR messages) among the CDFs in line with the observed RTT metrics for ongoing sessions and accounting requests. For example, the distributor unit 110 may determine, based on the calculated RTT metrics, that CDF1 has a RTT metric value that is twice the RTT metric value of CDF2. The distributor unit 110 may then determine that CDF1 is experiencing a build-up and may assign a lower priority (i.e., weight) for assignment of new ACR messages received from the CTF 104 for newly reported sessions (ACR Start messages).

In one aspect, the distributor unit 110 may use the Avg. RTT values determined in columns 3 and 4 of table 300, and the count metrics calculated in columns 6 and 7 of table 300, to determine that a particular CDF if experiencing a memory bottleneck. The distributor unit 110 may then adjust or revise in real-time the assigned weights of the distribution algorithm for CDFs 121-123. For example, the revised weights may be computed as shown below, where n identifies a particular CDF, and wn' indicates the revised distribution weight (column 8 of Table 300) that is computed for the nth CDF as a function of the calculated metrics:

$$wn'=f(Wn, rttn-n1, rttn-n2, \text{numsess}-n, \ldots)$$

Different embodiments may use different metrics to adjust or revise the distribution weights associated with each of the CDFs. For example, in a predominantly voice-only network the monitored number of ACR Interims may be less useful, especially if these ACR messages do not result in generation of partial CDRs that are known to induce additional load at the CDFs. Alternatively, however, a service provider that supports voice as well as data sessions may be configured to monitor the effect of session duration on the CDFs by monitoring the ACR Interim messages that are transmitted to each of the CDFs (e.g., over a N2 period of time).

In one exemplary embodiment, the distributor unit is configured to compute revised distribution weights for one or more of the CDFs based on the calculated average RTT for the last N1 ACRs during a normal traffic period (N2 period). For example, the distributor unit may compute the revised weights for CDF1 as:

$$w1'=(rtt1-n1+rtt2-n1+rtt3-n1)/3*w1/rtt1-n1(w1+w2+w3)$$

More generally, the distributor unit 110 may compute the revised distribution weights for a given CDF as (where i is an element from 1 . . . N CDFs):

$$wi'=(rtt1-n1+rtt2-n1+ \ldots +rttN-n1)/N*wN/rttN-n1 (w1+w2+ \ldots +wN)$$

Figure 4:
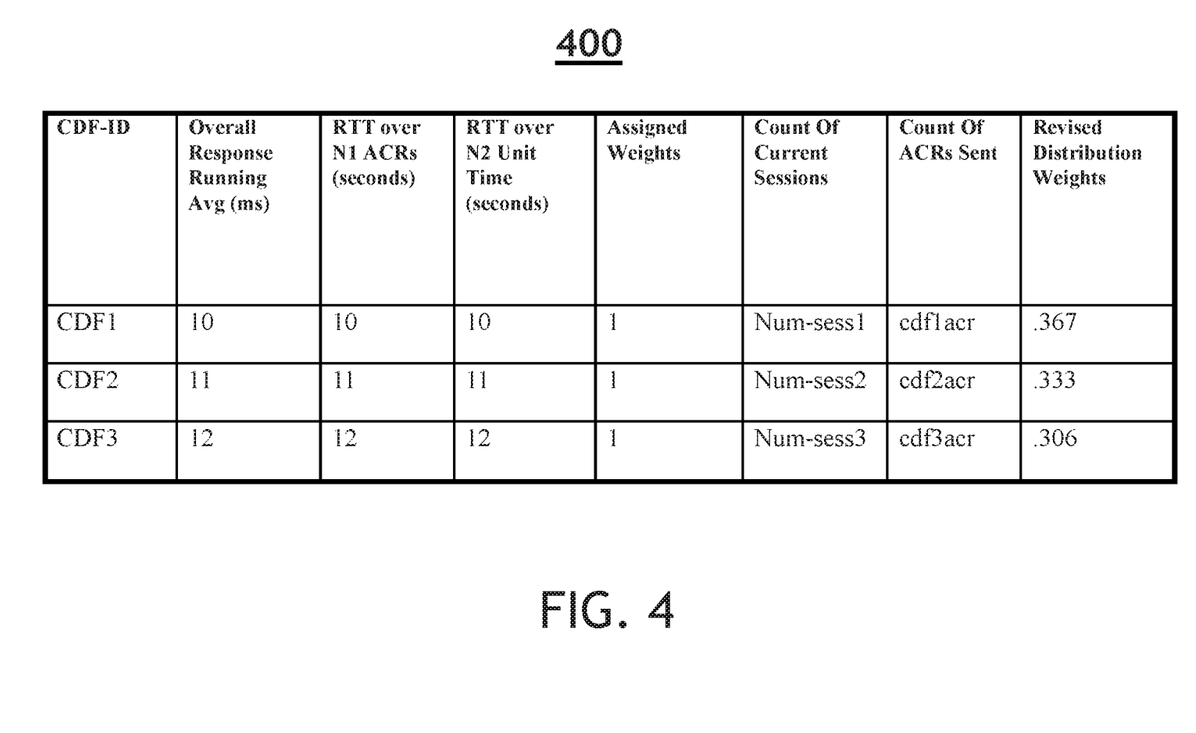
FIG. 4 illustrates an additional tabular example of information used for distributing Diameter charging requests or messages.

Table 400 illustrated in FIG. 4 shows a concrete example of metric values calculated by the distributor unit 110 (columns 2-4 of table 400) for each of the CDFs (column 1 of table 400), which are then used to compute the revised weights as shown in column 8 of table 400 in accordance with aspects described above. In this example, the CDFs 121-123 are assumed to initially start with equal pre-assigned weights (w1=w2=w3=1). The distributor unit 110 calculates average RTT values for each of the CDFs 121-123 as 10 ms, 11 ms and 12 ms based on the ACR messages that are distributed to each of the CDFs and the response messages received from the CDFs, and computes the revised weights shown in column 8 for each of the CDFs as described above.

In all aspects, the distributor unit 110 uses the computed revised distribution weights (column 8 of table 400) for the distribution algorithm to distribute newly received ACR messages to each of the CDFs. For the example shown in table 400, the revised weights of 0.367, 0.333, and 0.306 (column 8) are used to distribute 0.367 of all new ACR messages for new sessions to CDF1, 0.333 of all new ACR messages for new sessions to CDF2, and 0.306 of all new ACR messages for new sessions to CDF3. The expected result of such redistribution of new ACR messages is that the monitored Avg. RTT values for each of the CDFs should gradually equalize and stabilize at 11 ms, assuming that other parameters remain the same. It can be seen in this example of table 400 that CDF3 was exhibiting a build-up as indicated by the higher Avg. RTT metric, and the computation of revised weights as shown in column 8 effectively lessens the distribution of new ACR messages to CDF3, thus alleviating its load. This is in contrast to conventional static distribution methods in which the distributor unit 110 would continue to distribute ACR messages equally to the CDFs without taking into account the estimated load at each of the CDFs, which may eventually result in the overload of CDF3.

In one embodiment, the distributor unit 110 may be configured to determine a quiescent period in the network when it is observed that the metrics in column 4 (RTT Over Last N2 Unit Time) indicate a null value. This may occur for a given CDF when there is very little or no traffic is sent to the CDF in the last 'N2' seconds (during a quiet period of the network). In this case, the distributor unit 110 may be configured to generate and transmit ACR tracer packets to gauge the responsiveness of the CDF. An ACR tracer packet, as used in this disclosure, is a ACR message that is made up by the distributor unit 110 (as opposed to a real ACR message received from the CTF), and one that is deliberately malformed such that the destination CDF that receives the ACR tracer packet rejects the malformed message without producing a CDR. The distributor unit 110 expects, and receives, a response back from the destination CDF indicating the rejection of the distributed ACR tracer packet.

One example of generating a malformed ACR message that does not conform to 3GPP standards (and would therefore be rejected by the destination CDF) is as follows, where the crossed out text in the standard ACR message format indicates that the malformed ACR does not include Accounting-Record-Number field that is required to be included per the standards:

```
<ACR> ::= < Diameter Header: 271, REQ, PXY >
          < Session-Id >
          { Origin-Host }
          { Origin-Realm }
          { Destination-Realm }
```

{ Accounting-Record-Type }
{ ~~Accounting Record Number~~ }
[ Event-Timestamp ]

The reason for doing this is as follows: first, it is necessary to ensure that the ACR tracer packet does not result in a real CDR that is sent to the billing system. In order to ensure this, the ACR tracer packet is formed such that it is rejected by the CDF that it is distributed to. Thus, a mandatory Address Value Pair (AVP), known as the Accounting-Record-Number (shown above), is omitted from the generated ACR Tracer message. Second, because the required AVP that is selectively omitted in the ACR Tracer packet is chosen such that it is located further below and towards the end of the ACR Tracer message, the CDF parses almost to the end of message before rejecting the Tracer message, which may be understood by the distributor unit 110 to indicate that that the CDF functionality is available. Otherwise, some modular implementations of the OFCS may reject the ACR Tracer message too quickly at a lower level in the OSI 7-layer networking model defined in ISO 7498. For example, an implementation that uses a receptor module may parse the Diameter header, and without looking into the message contents, may reject the message if the header is malformed, which is not desirable. Third, the inclusion of Event-Timestamp in the ACR Tracer message is necessary to know when the tracer message was originated. The distributor unit 110 puts the current time in this Event-Timestamp AVP in the ACR before it sends out the message to a CDF instance, thus allowing the distributor unit to calculate metrics for the CDF as intended. A failure response, DIAMETER_MISSING_AVP, code 5005 is expected for this message. The message indicates that a mandatory AVP in request message is missing, as was done deliberately. The returned response, in the form of ACA, when received at the distributor unit 110 provides for computing the RTT for the message in a quiescent period.

Typically, the use of tracer ACRs may be indicated only during quiet periods to gauge the health of a CDF, during which time the distributor does not have an overview of a CDF's performance. When there is normal and ongoing traffic of ACR messages being received from the CTF, the distributor unit 110 may be configured to not generate and distribute the tracer ACRs.

As with normal ACR messages and ACA responses, the distributed ACR Tracer messages and their corresponding ACA responses rejecting the Tracer messages may be used to calculate the metrics for one or more CDFs, and to ultimately compute revised distribution weights for one or more CDFs preemptively during the network quiet period. Thus, if a quiescent network redistribution is necessary, as determined by the differences in the Avg. RTT of the distributed Tracer packets, the weight redistribution computation for CDF1, for example, may be as follows:

$$w1'=(rtt1-n2+rtt2-n2+ \ldots +rttN-n2)/N*WN/rttN-n2 \\ (w1+w2+ \ldots +wN)$$

A composite value based on the two approaches (rtt-N1 and rtt-N2) can be derived as well, with different weights applied to the results from the two methods, as necessary. In this case, the distributor unit 110 may be configured to elect the most recent performance data (rttN-n2) over historical value (rttN-n1) by assigning more weight to the former set of numbers. If equal weights are desired for both set of metrics, then the composite computation of the revised distribution weights may take the form:

$$Wi'=0.5*(rtt1-n1+rtt2-n1+ \ldots +rttN-n1)/N*WN/ \\ rttN-n1(w1+w2+ \ldots +wN)+0.5*(rtt1-n2+rtt2- \\ n2+ \ldots +rttN-n2)/N*WN/rttN-n2(w1+ \\ w2+ \ldots +wN)$$

With the revision in metric weights between the available CDFs, the distributor unit may be configured to apply the new metric weights in making new session routing decisions.

In some embodiments, the distributor unit 110 may be configured to reduce the distribution of ACR messages to a newly added CDF to gradually initialize the newly added CDF into the workload of the existing CDFs. This may occur where a new CDF is introduced or re-introduced into the OFCS after being offline or out of service for some time.

As noted previously, the process 200 described above may dynamically adjust the distribution pattern (via the computed distributed weights) of the ACR messages received from the CTF and distributed to each of the CDFs. The process achieves "session-stickiness" by continuing to send ACRs for ongoing sessions to certain CDFs, while distributing new ACR sessions based on the revised weights that are determined based on the calculated and monitored metrics that are derived from previously distributed ACRs and responses received from the CDFs. In doing so, the distributor unit alleviates or prevents overload conditions from developing to the point where a CDF's performance is noticeably impacted, and provides a CDF with time and resources for recovery of to a normal operating status.

It will be apparent to one skilled in the art that many modifications can be made to the illustrative embodiments described above.

In all embodiments, the distributor unit 110 may be configured to continue to send ACRs for ongoing sessions to previously selected CDFs to maintain "session-stickiness" and prevent or reduce incomplete CDRs, while also reducing transmission of ACRs for new sessions to certain CDFs that are or anticipated to be in a potential overload condition. In some embodiments, the distributor unit 110 may be configured with a distribution algorithm to distribute ACRs based on a static hashing algorithm as described previously during normal conditions, but where the distribution algorithm may be further configured to give higher priority to the computed revised weights when it is determined that a revised distribution pattern is indicated as described above. In this scenario, in one embodiment the distributor unit may be configured to "override" a distribution destination that is selected based solely on static hashing with another distribution destination that is selected in view of the revised weights as described in detail above. In order to avoid the burden of first computing a static hash to select a destination CDF and then selecting another destination CDF in view of the revised weights to maintain session stickiness for ACRs of a same session, an override mechanism such as described in commonly assigned '199 patent may be (optionally) implemented, which would avoid having to compute hashed destinations for subsequent ACRs of a session for which an ACR Start message is assigned to a destination CDF that is selected based on the revised weights rather than the hashing function alone.

OFCS are CPU-bound in a majority of cases. Any enhancement that can help in deriving a better overall network throughput would be welcome by operators, and vendors. Until now, the distribution strategy has followed static allocation, or a binary on/off situation and it is debatable if the latter is a solution or another problem. The present disclosure provides a predictive dynamism to the static distribution of ACR messages. There are several advantages to the various aspects disclosed herein. First, the systems and methods disclosed herein provide for disparate capacity CDFs via inclusion and assignment of different initial distribution weights assigned to each CDF based on its capacity (i.e., resources). Second, the systems and methods disclosed herein provide for dynamic and real-time measurement of CDF behavior to detect early warning signs of lagging performance at a CDF. Third, altering the distribution pattern of new ACRs based on computed revised distribution weights provides for alleviating loads at a CDF that is determined to be lagging. Forth, the systems and methods disclosed herein allow for various types of metrics to be collected and used, as appropriate, to compute the revised distribution weights used to distribute new ACRs. Fifth, the systems and methods disclosed herein allow for gradually introducing CDFs into the OFCS. Sixth, maintenance of active sessions terminating on each CDF provides a simple load perspective. Seventh, the distribution is self-monitored and self-corrective. As such, this is an adaptive behavior that modulates its function based on values measured in the network.

Figure 5:
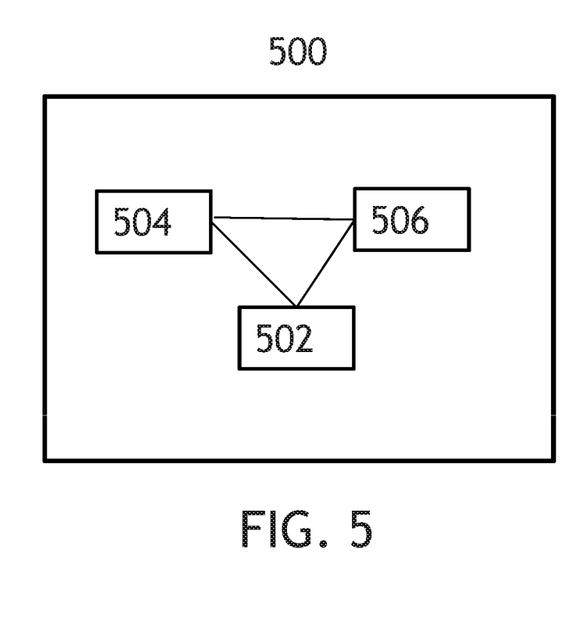
FIG. 5 illustrates a block-diagram example of an apparatus for implementing various aspects of the disclosure.

FIG. 5 depicts a high-level block diagram of a computing apparatus 500 suitable for implementing various aspects of the disclosure (e.g., one or more steps of process 200). Although illustrated in a single block, in other embodiments the apparatus 500 may also be implemented using parallel and distributed architectures. Thus, for example, various steps such as those illustrated in the example of process 200 may be executed using apparatus 500 sequentially, in parallel, or in a different order based on particular implementations. Apparatus 500 includes a processor 502 (e.g., a central processing unit ("CPU")), that is communicatively interconnected with various input/output devices 504 and a memory 506. Apparatus 500 may be implemented as one or more blades in a blade chassis.

The processor 502 may be any type of processor such as a general purpose central processing unit ("CPU") or a dedicated microprocessor such as an embedded microcontroller or a digital signal processor ("DSP"). The input/output devices 504 may be any peripheral device operating under the control of the processor 502 and configured to input data into or output data from the apparatus 500, such as, for example, network adapters, data ports, and various user interface devices such as a keyboard, a keypad, a mouse, or a display.

Memory 506 may be any type of memory suitable for storing electronic information, such as, for example, transitory random access memory (RAM) or non-transitory memory such as read only memory (ROM), hard disk drive memory, compact disk drive memory, optical memory, etc. The memory 506 may include data (e.g., information illustrated in table 300) and instructions which, upon execution by the processor 502, may configure or cause the apparatus 500 to perform or execute the functionality or aspects described hereinabove (e.g., one or more steps of process 500). In addition, apparatus 500 may also include other components typically found in computing systems, such as an operating system, queue managers, device drivers, or one or more network protocols that are stored in memory 506 and executed by the processor 502.

While a particular embodiment of apparatus 500 is illustrated in FIG. 5, various aspects of in accordance with the present disclosure may also be implemented using one or more application specific integrated circuits (ASICs), field programmable gate arrays (FPGAs), or any other combination of hardware or software. For example, data may be stored in various types of data structures (e.g., linked list) which may be accessed and manipulated by a programmable processor (e.g., CPU or FPGA) that is implemented using software, hardware, or combination thereof.

Although aspects herein have been described with reference to particular embodiments, it is to be understood that these embodiments are merely illustrative of the principles and applications of the present disclosure. It is therefore to be understood that numerous modifications can be made to the illustrative embodiments and that other arrangements can be devised without departing from the spirit and scope of the disclosure.

The invention claimed is:

1. An Offline Charging System (OFCS) of a telecommunications network, the Offline Charging System comprising:
a distributor unit for distributing Diameter messages received from a plurality of network elements of the telecommunications network, the Diameter messages being associated with a plurality of Diameter sessions provided by the network elements, the distributor unit including a memory for storing instructions and data and a processor configured to execute the instructions and process the data, wherein the one or more instructions, when executed by the processor, configure the distributor unit to:
  distribute the received Diameter messages to a plurality of Charging Data Function (CDF) units of the OFCS in accordance with distribution weights associated with each of the plurality of CDF units, such that Diameter messages associated with a same Diameter session are distributed to a same CDF unit;
  receive Diameter response messages from the plurality of CDF units in response to the distributed Diameter messages;
  calculate measured metrics for each the plurality of CDF units based on the distributed Diameter messages and the received Diameter response messages; and,
  adjust the distribution weights used for distributing Diameter messages for new Diameter sessions to the plurality of CDF units based on the measured metrics.

2. The Offline Charging System of claim 1, wherein the distributor unit is further configured to:
  distribute tracer messages as part of the distributed Diameter messages in accordance with distribution weights associated with each of the plurality of CDF units; and,
  calculate the measured metrics for one or more of the plurality of CDF units based at least in part on the distributed tracer messages and corresponding Diameter response messages received in response to the distributed tracer messages.

3. The Offline Charging System of claim 2, wherein the distributed tracer messages distributed by the distributor unit are malformed Diameter messages that are generated by the distributor unit, and the corresponding Diameter response messages received in response to the distributed tracer messages are error messages rejecting the distributed tracer messages.

4. The Offline Charging System of claim 3, wherein the distributor unit is further configured to:
  distribute the tracer messages to the plurality of CDF units only during a quiescent period of time that is determined based on the measured metrics.

5. The Offline Charging System of claim 1, wherein the distributor unit is configured to calculate a lifetime average response time for each of the plurality of CDFs units taking into account a plurality Diameter messages distributed to and corresponding response messages received from each respective CDF unit.

6. The Offline Charging System of claim 1, wherein the distributor unit is configured to calculate a running Round Trip Time for each of the plurality of CDFs units taking into account most recent N number of Diameter messages distributed to and corresponding response messages received from each respective CDF unit.

7. The Offline Charging System of claim 1, wherein the distributor unit is configured to calculate a running Round Trip Time for each of the plurality of CDFs units taking into account Diameter messages distributed to and corresponding response messages received from each respective CDF unit over a given M duration of time.

8. The Offline Charging System of claim 1, wherein the distributor unit is configured to calculate a total number of current sessions hosted by each of the plurality of CDFs units based on account Diameter messages distributed to and corresponding response messages received from each respective CDF.

9. The Offline Charging System of claim 1, wherein the distributor unit is configured to calculate a total Diameter messages distributed to each respective CDF.

10. The Offline Charging System of claim 1, wherein the distributor unit is configured to distribute Diameter messages associated with a same Diameter session to a same one of the plurality of CDFs.

11. A method for processing messages in an Offline Charging System (OFCS) of a telecommunications network, the method comprising:
    receiving, at a distributor unit of the Offline Charging System, Diameter messages transmitted by a plurality of network elements of the telecommunications network, the Diameter messages being associated with a plurality of Diameter sessions provided by the network elements;
    distributing, from the distributor unit, the Diameter messages received from the plurality of network elements to a plurality of Charging Data Function (CDF) units of the OFCS in accordance with distribution weights associated with each of the plurality of CDF units, such that Diameter messages associated with a same Diameter session are distributed to a same CDF unit;
    receiving, at the distributor unit, Diameter response messages from the plurality of CDF units in response to the distributed Diameter messages;
    calculating, at the distributor unit, measured metrics for each the plurality of CDF units based on the distributed Diameter messages and the received Diameter response messages; and,
    adjusting, at the distributor unit the distribution weights used for distributing Diameter messages for new Diameter sessions to the plurality of CDF units based on the measured metrics.

12. The method of claim 11, further comprising:
    distributing, from the distributor unit, tracer messages as part of the distributed Diameter messages in accordance with distribution weights associated with each of the plurality of CDF units; and,
    calculating, at the distributor unit, the measured metrics for one or more of the plurality of CDF units based at least in part on the distributed tracer messages and corresponding Diameter response messages received in response to the distributed tracer messages.

13. The method of claim 11, further comprising distributing, from the distributor unit to one or more of the plurality of CDF units, tracer messages that are malformed Diameter messages and the receiving, at the distributor unit, corresponding Diameter response messages that are error messages rejecting the distributed tracer messages.

14. The method of claim 11, the method further comprising:
    distributing, from the distributor unit, the tracer messages to one or more of the plurality of CDF units only during a quiescent period of time that is determined based on the measured metrics.

15. The method of claim 11, the method further comprising:
    calculating, at the distributor unit, a lifetime average response time for each of the plurality of CDFs units taking into account a plurality Diameter messages distributed to and corresponding response messages received from each respective CDF unit.

16. The method of claim 11, the method further comprising:
    calculating, at the distributor unit, a running Round Trip Time for each of the plurality of CDFs units taking into account most recent N number of Diameter messages distributed to and corresponding response messages received from each respective CDF unit.

17. The method of claim 11, the method further comprising:
    calculating, at the distributor unit, a running Round Trip Time for each of the plurality of CDFs units taking into account Diameter messages distributed to and corresponding response messages received from each respective CDF unit over a given M duration of time.

18. The method of claim 11, the method further comprising:
    calculating, at the distributor unit, a total number of current sessions hosted by each of the plurality of CDFs units based on account Diameter messages distributed to and corresponding response messages received from each respective CDF.

19. The method of claim 11, the method further comprising:
    calculating, at the distributor unit, a total Diameter messages distributed to each respective CDF.

20. The method of claim 11, the method further comprising:
    distributing, from the distributor unit, Diameter messages associated with a same Diameter session to a same one of the plurality of CDFs.

* * * * *